UNITED STATES PATENT OFFICE.

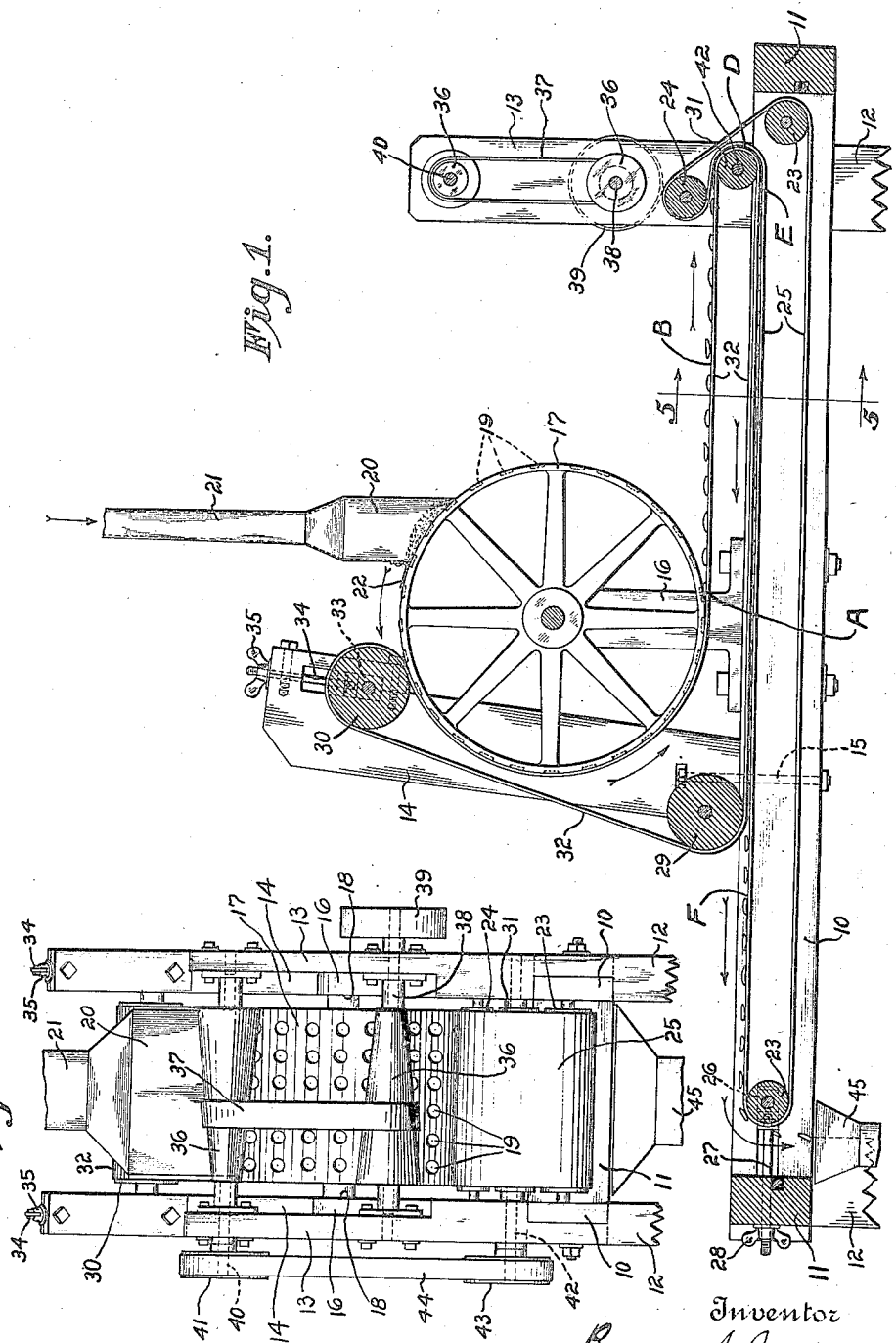

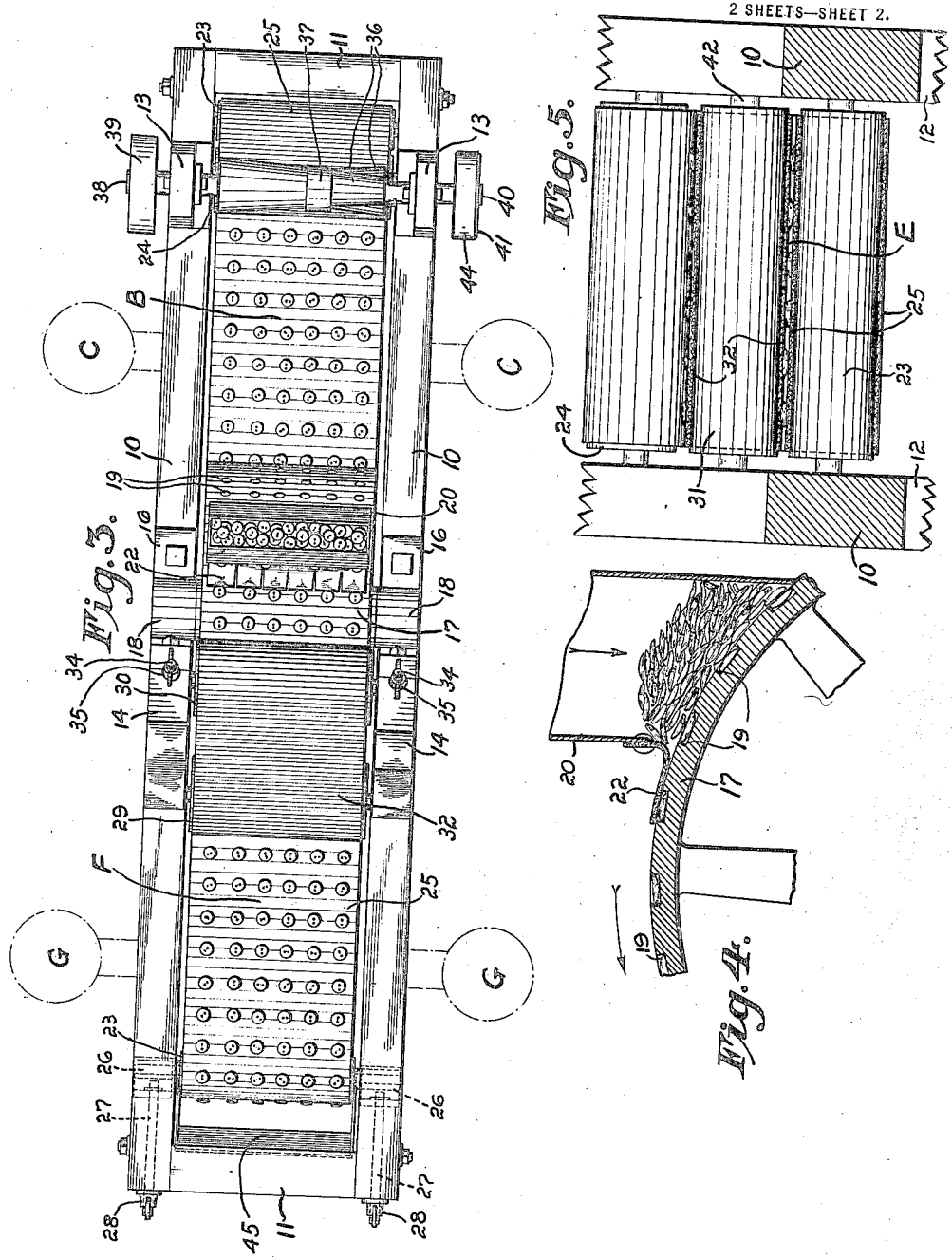

BRUCE N. GRIFFING, OF SHELTON, CONNECTICUT, ASSIGNOR TO THE GRIFFIN BUTTON COMPANY, OF SHELTON, CONNECTICUT, A CORPORATION OF CONNECTICUT.

MACHINE FOR REVERSING SMALL ARTICLES.

1,385,000.  Specification of Letters Patent.  Patented July 19, 1921.

Application filed June 30, 1920. Serial No. 393,017.

*To all whom it may concern:*

Be it known that I, BRUCE N. GRIFFING, a citizen of the United States, residing at Shelton, county of Fairfield, State of Connecticut, have invented an Improvement in Machines for Reversing Small Articles, of which the following is a specification.

This invention relates to a machine for reversing small articles, such as disks and the like, so as to successively present both sides of the articles to view in order that they may be inspected and separated into grades or lots, and the invention has for its object to provide simple mechanical means for assembling the articles, for transporting them to a location where one side of each is visible, and for reversing the position of the articles and transporting them to a different location where the opposite side of each can be inspected. Heretofore, the work of assembling small articles of the present character to make ready for the necessary inspection has been manually performed. This has been a tedious and laborious operation for the reason that each article has had to be separately handled, and has produced unsatisfactory results because the assembling process has necessarily lacked system. The machine of the invention is continuous in its operation and requires no manual labor whatever in the performance of its functions, leaving nothing to distract the attention of the employee from the work of inspection, the articles to be inspected being mechanically handled and removed from the machine.

With the above and other objects in view, the invention comprises the construction, arrangement and operation of parts as now to be fully described and hereinafter specifically claimed.

In the accompanying drawing forming a part of this specification,

Figure 1 is a vertical, longitudinal sectional view of the entire machine;

Fig. 2 an end elevation as seen from the right in Fig. 1;

Fig. 3 is a top plan view;

Fig. 4 a detail sectional view of a portion of the conveyer wheel and hopper; and Fig. 5 is a sectional view on line 5—5 in Fig. 1, looking in the direction of the arrows.

The frame of the machine consists of side members 10 and end members 11 which are supported by legs 12 located at opposite ends of the side members. The legs at one end of the frame, the right hand end in Figs. 1 and 3, are extended upwardly to provide supporting arms 13 for a purpose to be explained. The side members support uprights 14, which are arranged opposite each other and are secured to the side members in any convenient manner, as by bolts 15, and brackets 16, which are also arranged opposite each other and are located between the uprights and supporting arms.

A conveyer wheel 17 journaled in the brackets as indicated at 18 and provided with depressions 19 which are each about the size of the articles to be inspected is adapted to carry the articles from a hopper 20, the articles being delivered to the hopper through a chute 21. The conveyer wheel is adapted to be rotated in the direction of the arrow in Figs. 1 and 4. As shown very clearly in Figs. 4 and 5, the lower edge of the hopper is provided with flaps 22 which are adapted to allow the articles which are in the depressions to be removed, but to retain the remainder of the articles in the hopper.

A pair of drums, denoted by 23, which are adapted to freely rotate, are journaled in the opposite ends of the side members of the frame, and a drum 24, which is also adapted to freely rotate, is journaled in the supporting arms. A conveyer belt 25 is spun around the pair of drums, denoted by 23, and drum 24, and one of said pair of drums, the one at the left in Figs. 1 and 3, is supported by sliding bearing blocks 26 which are adjustable longitudinally of the side members by means of bolts 27 provided with wing nuts 28, in order that conveyer belt 25 may be properly tensioned. A pair of drums, denoted by 29 and 30, respectively, which are also adapted to freely rotate, are journaled in the uprights, drum 29 being located closely adjacent the side members of the frame and drum 30 being located near the upper end of the uprights and closely adjacent the upper portion of the conveyer wheel as very clearly disclosed in Fig. 1. The supporting arms also carry a drum 31 which is preferably located between one of drums 23 and drum 24 in about the position shown in Fig. 1, and is adapted to have transmitted to it the power by which the mechanism of the invention is operated. A second conveyer belt 32 is spun around drums 29, 30 and 31 and is adapted to engage a portion of the conveyer wheel. Drum 30 is supported by sliding bearing blocks 33 which are adjustable longitudinally of the uprights by means of bolts 34 provided with wing nuts 35, in order that conveyer belt 32 may be properly tensioned.

Drum 31 may be caused to rotate in any convenient manner. As shown, I preferably provide a pair of conical pulleys 36, which are journaled in the supporting arms, for this purpose. A power transmission belt 37 is spun around the conical pulleys, and one of said pulleys is provided with a shaft 38 which rigidly carries a power receiving pulley 39, while the other of said pulleys is provided with a shaft 40 which rigidly carries a pulley 41. The shaft, denoted by 42, of drum 31 rigidly carries a pulley 43, and a second power transmission belt 44 is spun around pulleys 41 and 43.

The two conveyer belts are preferably about the width of the conveyer wheel. As before mentioned, conveyer belt 32 is spun around drums 29, 30 and 31 and a portion of said belt rests against the conveyer wheel. As clearly disclosed in Fig. 1, conveyer belt 25, which is spun around the pair of drums carried by the frame and drum 24, is so arranged that it bears against the portion of conveyer belt 32 which is contiguous with drum 31. When now drum 31 is rotated in a clockwise direction conveyer belt 32 will be caused to move in the direction of the arrows in Fig. 1, to rotate the conveyer wheel, and conveyer belt 25, by reason of its engagement with conveyer belt 32, will be frictionally driven so that it will move in the direction of the said arrows, the pair of drums and drum 24 being caused to rotate in their bearings.

The small articles to be inspected are dropped into the hopper through chute 21, and rest against the periphery of the conveyer wheel. As the conveyer wheel rotates, those articles which locate themselves in the depressions move forward with said wheel. Conveyer belt 32 is so located and arranged with respect to the conveyer wheel that the articles are held in the depressions until they reach the lower portion of the wheel. They are here deposited upon a horizontal portion of conveyer belt 32 as denoted by A in Fig. 1, and are moved by said belt across the space designated B in Figs. 1 and 3 where one side of each is presented to the view of employees who may be located upon opposite sides of the frame, as indicated at C C. They are next carried by conveyer belt 32 around drum 31 and made to pass between the conveyer belts, as indicated at D in Fig. 1, the articles being here turned over and deposited upon a horizontal portion of conveyer belt 25, as indicated at E in Fig. 1. They are finally carried by conveyer belt 25 across the space designated F in Figs. 1 and 3, where the opposite side of each is presented to the view of employees who may be located at the positions G G, and deposited into a chute 45, it being of course understood that only the desirable articles reach chute 45. The undesirable ones are removed as they are detected by the employees. It will be obvious that the articles which are located between the conveyer belts assist in the frictional driving of conveyer belt 25.

It is to be understood that the positions of the elements of the machine of the invention may be reversed and that various changes in details of construction may be made without departing from the spirit of the invention and the scope of the appended claims. For example, the mechanism may be set up so that the drum which receives and transmits the power to rotate the conveyer wheel and to drive the conveyer belts is adapted to rotate in a counter-clockwise direction, and any convenient means may be employed for initially depositing the articles upon one of the conveyer belts.

Having fully described my invention, what I claim is:

1. A machine of the character described comprising a conveyer wheel, a pair of article carrying conveyer belts, said belts being disposed in frictional engagement, one of said belts being disposed in frictional engagement with said wheel, and means for driving the conveyer belts and for causing the conveyer wheel to be rotated, whereby articles are transferred from one of said belts to the other of said belts reversing the position of each article on the belts.

2. A machine of the character described comprising a conveyer wheel which is adapted to receive small articles, a conveyer belt in frictional engagement therewith for transferring articles from the conveyer wheel to the conveyer belt, a second conveyer belt in frictional engagement with said first mentioned conveyer belt for transferring articles to said second mentioned conveyer belt and disposed relative thereto for giving the articles a half turn, and means for driving the conveyer belts and for rotating the conveyer wheel, whereby both sides of the articles may be successively presented to view.

3. A machine of the character described comprising a conveyer wheel provided with spaced depressions adapted to receive small articles, a conveyer belt in frictional engagement therewith for transferring articles from the depressions in the conveyer wheel to the conveyer belt, a second conveyer belt disposed in frictional engagement with the first named belt for transferring articles from said first mentioned conveyer belt to said second mentioned conveyer belt and for giving the articles a half-turn, and means for driving the conveyer belts and for rotating the conveyer wheel.

4. In a machine of the character described, a conveyer wheel adapted to convey small articles, a conveyer belt disposed in frictional engagement therewith for conveying articles therefrom in one position, a second conveyer belt disposed in frictional engagement with the first named belt for conveying articles therefrom in a reverse position, said belts and wheel being arranged whereby articles conveyed serve to increase the frictional engagement of said belts and wheel.

5. A machine of the character described, comprising a frame, uprights and supporting arms carried thereby, drums journaled in said uprights and arms, a conveyer belt carried by said drums and adapted to transport articles in one position, drums journaled in said frame and arms, a conveyer belt carried by said last named drums and associated with the first named belt whereby to receive articles therefrom and transport same in a reverse position, and means for driving said belts.

6. A machine of the character described, comprising a frame, uprights and supporting arms carried thereby, drums journaled in said uprights and arms, a conveyer belt carried by said drums and adapted to transport articles in one position, drums journaled in said frame and arms, a conveyer belt carried by the last named drums in frictional engagement with the first named belt whereby to receive articles therefrom in a reverse position and transport same, and means for driving said belts.

7. A machine of the character described, comprising a frame, a wheel journaled therein and adapted to convey small articles in spaced relation, a conveyer belt disposed in the frame in frictional engagement with a portion of said wheel whereby to receive and transport articles therefrom in one position, a second conveyer belt disposed in the frame in frictional engagement with the first named belt, said second belt being positioned relative to the first named belt whereby to receive and transport articles therefrom in a reverse position, and means for driving said belts and wheel.

8. A machine of the character described, comprising a frame, standards carried thereby, a wheel journaled in said standards above the frame and adapted to receive and convey small articles in spaced relation, uprights carried by the frame adjacent said wheel, supporting arms on one end of said frame, a drum journaled in said uprights above the wheel, a drum journaled in said uprights below the wheel and above the frame, a drum journaled in said supporting arms above the frame, a conveyer belt carried by said drums and in frictional engagement with a portion of said wheel to receive and transport articles therefrom in one position, a pair of drums journaled one in each end of the frame, a drum journaled in the supporting arms above said frame and above the first named drum in said arms, a conveyer belt carried by the last named series of drums and in frictional engagement with the first named belt whereby to receive and transport articles therefrom in a reverse position, and power transmission means connected to one of said drums for driving said belts and wheel.

In testimony whereof I affix my signature.

BRUCE N. GRIFFING.